US012651751B2

(12) United States Patent
Song et al.

(10) Patent No.: US 12,651,751 B2
(45) Date of Patent: Jun. 9, 2026

(54) METHOD FOR MANUFACTURING ELECTRODE FOR ALL-SOLID-STATE BATTERIES BY SEMI-DRY PROCESS

(71) Applicants:HYUNDAI MOTOR COMPANY, Seoul (KR); KIA CORPORATION, Seoul (KR)

(72) Inventors: Kyung Yup Song, Yongin-si (KR); Jong Hwan Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 590 days.

(21) Appl. No.: 18/074,956

(22) Filed: Dec. 5, 2022

(65) Prior Publication Data

US 2023/0178747 A1      Jun. 8, 2023

(30) Foreign Application Priority Data

Dec. 3, 2021    (KR) ........................ 10-2021-0171380

(51) Int. Cl.
*H01M 10/00*         (2006.01)
*H01M 4/04*          (2006.01)
*H01M 4/139*         (2010.01)
*H01M 4/62*          (2006.01)
*H01M 10/0562*       (2010.01)

(52) U.S. Cl.
CPC ........... *H01M 4/623* (2013.01); *H01M 4/043* (2013.01); *H01M 4/0435* (2013.01); *H01M 4/139* (2013.01); *H01M 4/621* (2013.01); *H01M 10/0562* (2013.01)

(58) Field of Classification Search
CPC .... H01M 4/623; H01M 4/043; H01M 4/0435; H01M 4/139; H01M 4/621; H01M 10/0562
See application file for complete search history.

(56) References Cited

U.S. PATENT DOCUMENTS

2015/0061176 A1*   3/2015   Bruckner ............. H01M 4/0411
                                                          264/105
2017/0214051 A1*   7/2017   Yoon ................. H01M 10/0525
2018/0083260 A1*   3/2018   Jiang ...................... H01M 4/48
2020/0287208 A1*   9/2020   Komura ............ H01M 10/0562

FOREIGN PATENT DOCUMENTS

KR         10-1766516 B1       8/2017
KR         10-1778355 B1       9/2017
KR         10-1863518 B1       5/2018
KR      10-2019-0124038 A     11/2019
KR      10-2020-0020702 A      2/2020
KR         10-2212612 B1       2/2021
KR         10-2342275 B1      12/2021

* cited by examiner

*Primary Examiner* — Nicholas P D'Aniello
(74) *Attorney, Agent, or Firm* — Morgan Lewis & Bockius LLP

(57)                ABSTRACT
A method for manufacturing an electrode for all-solid-state batteries uses a wet binder and a dry binder.

7 Claims, 4 Drawing Sheets

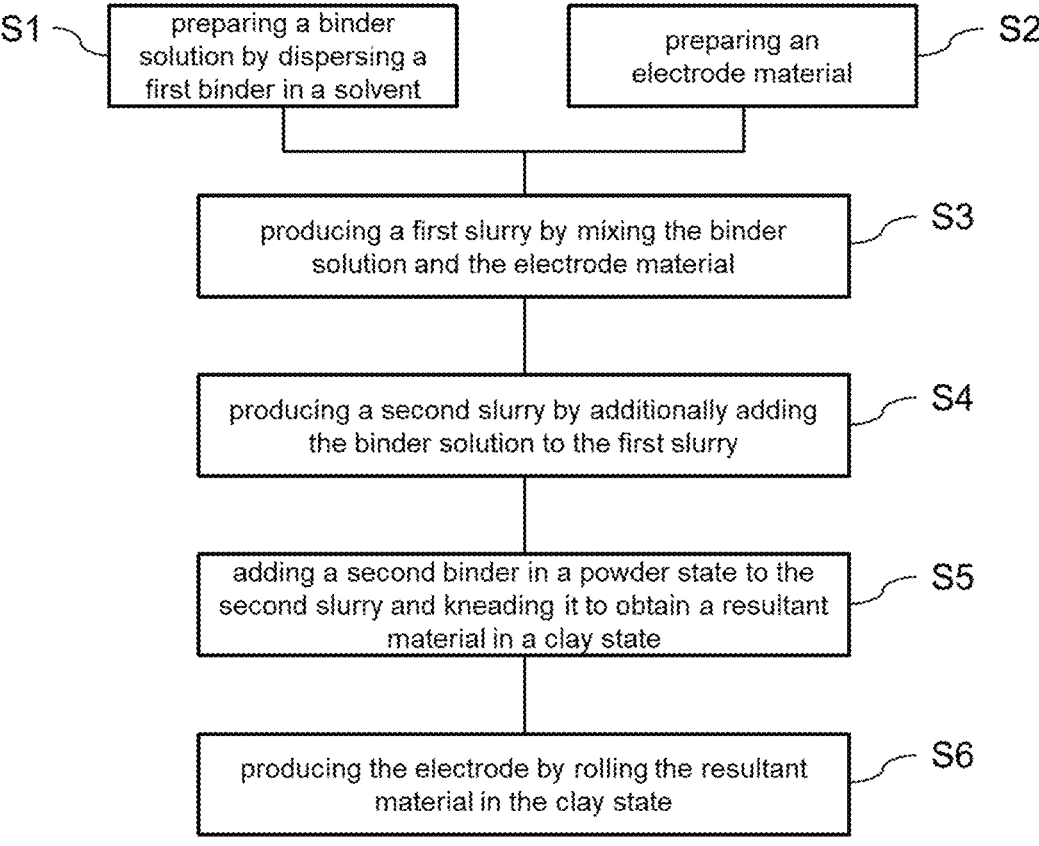

S1 — preparing a binder solution by dispersing a first binder in a solvent

S2 — preparing an electrode material

S3 — producing a first slurry by mixing the binder solution and the electrode material S4 — producing a second slurry by additionally adding the binder solution to the first slurry S5 — adding a second binder in a powder state to the second slurry and kneading it to obtain a resultant material in a clay state S6 — producing the electrode by rolling the resultant material in the clay state

FIG. 1

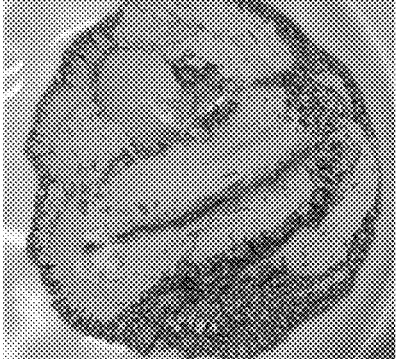

FIG. 2A

NON-DISPERSED PTFE

METHOD FOR MANUFACTURING ELECTRODE FOR ALL-SOLID-STATE BATTERIES BY SEMI-DRY PROCESS

CROSS-REFERENCE TO RELATED APPLICATION

This application claims under 35 U.S.C. § 119(a) the benefit of priority to Korean Patent Application No. 10-2021-0171380 filed on Dec. 3, 2021 in the Korean Intellectual Property Office, the entire contents of which are incorporated herein by reference.

TECHNICAL FIELD

The present disclosure relates to a method for manufacturing an electrode for all-solid-state batteries using a wet binder and a dry binder.

BACKGROUND

In order to keep up with recent trends to weight reduction, miniaturization and multifunctionalization of portable devices, increase in the energy density of a lithium ion battery used as a power supply in these devices is required.

Particularly, as interest in batteries used in electric vehicles and energy storage devices and performance demands of the batteries are increased, high-energy density cells have been developed.

However, safety problems such as fires in high-energy density lithium ion batteries have emerged as social problems, development of an all-solid-state battery having high energy density and high stability is required.

In order to manufacture an all-solid-state battery having a high capacity, it is necessary to implement a cathode having a large loading amount of a cathode active material, but it is difficult to implement such a cathode through a conventional wet process. Therefore, there was an attempt to manufacture a cathode through a dry process, but the dry process has difficulty in manufacturing an electrode having a uniform thickness and causes problems, such as floating of a binder, etc.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a method for uniformly manufacturing an electrode in the form of a thin film having a large loading amount of an electrode active material.

It is another object of the present disclosure to provide a method for easily and rapidly manufacturing an electrode in the form of a thin film having a large loading amount of an electrode active material.

In one aspect, the present disclosure provides a method for manufacturing an electrode for all-solid-state batteries, the method including preparing a binder solution by dispersing a first binder in a solvent, preparing an electrode material including an electrode active material and a solid electrolyte, producing a first slurry by mixing the binder solution and the electrode material, producing a second slurry by additionally adding the binder solution to the first slurry, adding a second binder to the second slurry and kneading it to obtain a resultant material in a clay state, and producing the electrode by rolling the resultant material in the clay state.

In a preferred embodiment, the first binder may include at least one selected from the group consisting of butadiene rubber (BR), nitrile butadiene rubber (NBR), hydrogenated nitrile butadiene rubber (HNBR), polyvinylidene difluoride (PVDF), carboxymethyl cellulose (CMC), and combinations thereof.

In another preferred embodiment, the solvent may include at least one selected from the group consisting of hexyl butyrate, xylene, toluene, butyl butyrate, benzyl acetate, and combinations thereof.

In still another preferred embodiment, the binder solution may include an amount of about 5% by weight to 10% by weight of the first binder and an amount of about 90% by weight to 95% by weight of the solvent.

In yet another preferred embodiment, the electrode material may further include a conductive material.

In still yet another preferred embodiment, a solid content in the first slurry may be greater than about 90% by weight and 95% by weight or less.

In a further preferred embodiment, a solid content in the second slurry may range from about 60% by weight to 90% by weight.

In another further preferred embodiment, the second binder may include at least one selected from the group consisting of polytetrafluoroethylene (PTFE), polyvinylidene difluoride (PVDF), poly(ethylene oxide) (PEO), polyethylene (PE), and combinations thereof.

In still another further preferred embodiment, wherein the resultant material is prepared by adding the second binder to the second slurry and kneading it at about 10 rpm to 50 rpm for about 10 minutes to 1 hour.

In yet another further preferred embodiment, wherein the second binder is fiberized during kneading.

In still yet another further preferred embodiment, the method may further include drying the electrode.

In a still further preferred embodiment, the electrode may include an amount of about 70% by weight to 90% by weight of the electrode active material, an amount of about 5% by weight to 25% by weight of the solid electrolyte, an amount of about 0.5% by weight to 5% by weight of the first binder, and an amount of about 0.1% by weight to 10% by weight of the second binder.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 shows a flowchart of a method for manufacturing an electrode according to the present disclosure;

FIG. 2A shows an image of a resultant material manufactured according to Comparative Example 1;

Figure 2B:
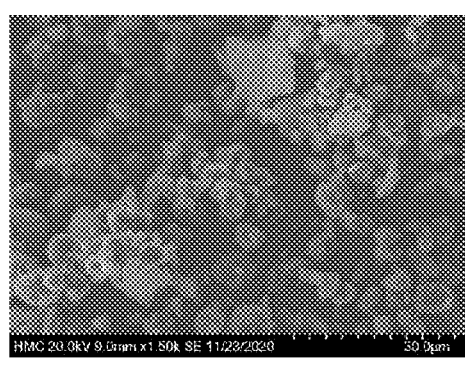
FIG. 2B shows an analysis result of the resultant material of FIG. 2A using a scanning electron microscope (SEM)

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above-described objects, other objects, advantages and features of the present disclosure will become apparent from the descriptions of embodiments given herein below with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure. Singular expressions may encompass plural expressions, unless they have clearly different contextual meanings.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus it will be understood that they are modified by the term "about", unless stated otherwise. As used herein, the term "about" means modifying, for example, lengths, degrees of errors, dimensions, the quantity of an ingredient in a composition, concentrations, volumes, process temperature, process time, yields, flow rates, pressures, and like values, and ranges thereof, refers to variation in the numerical quantity that may occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. Whether modified by the term "about" the claims appended hereto include equivalents to these quantities. The term "about" further may refer to a range of values that are similar to the stated reference value. In certain embodiments, the term "about" refers to a range of values that fall within 10, 9, 8, 7, 6, 5, 4, 3, 2, 1 percent above or below the numerical value (except where such number would exceed 100% of a possible value or go below 0%) or a plus/minus manufacturing/measurement tolerance of the numerical value. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

FIG. 1 shows a flowchart of a method for manufacturing an electrode according to the present disclosure. Referring to this figure, the method for manufacturing the electrode may include preparing a binder solution by dispersing a first binder in a solvent (S1), preparing an electrode material including an electrode active material and a solid electrolyte (S2), producing a first slurry by mixing the binder solution and the electrode material (S3), producing a second slurry by additionally adding the binder solution to the first slurry (S4), adding a second binder in a powder state to the second slurry and kneading it to obtain a resultant material in a clay state (S5), and producing the electrode by rolling the resultant material (S6).

The first binder may hold particles of the electrode material including the electrode active material and the solid electrolyte together. The first binder may include at least one selected from the group consisting of butadiene rubber (BR), nitrile butadiene rubber (NBR), hydrogenated nitrile butadiene rubber (HNBR), polyvinylidene difluoride (PVDF), carboxymethyl cellulose (CMC), and combinations thereof.

The solvent may use any material which may disperse the first binder therein. For example, the solvent may include at least one selected from the group consisting of hexyl butyrate, xylene, toluene, butyl butyrate, benzyl acetate, and combinations thereof.

The binder solution may include an amount of about 5% by weight to 10% by weight of the first binder and an amount of about 90% by weight to 95% by weight of the solvent. When the content of the first binder in the binder solution is less than 5% by weight, it may be difficult to implement a solid content in the slurry, which will be described later.

The electrode active material may include a cathode active material or an anode active material.

The cathode active material may include, for example, an oxide active material or a sulfide active material, without being limited to a specific material.

The oxide active material may include a rock salt layer-type active material, such as $LiCoO_2$, $LiMnO_2$, $LiNiO_2$, $LiVO_2$ or $Li_{1+x}Ni_{1/3}Co_{1/3}Mn_{1/3}O_2$, a spinel-type active material, such as $LiMn_2O_4$ or $Li(Ni_{0.5}Mn_{1.5})O_4$, an inverted spinel-type active material, such as $LiNiVO_4$ or $LiCoVO_4$, an olivine-type active material, such as $LiFePO_4$, $LiMnPO_4$, $LiCoPO_4$ or $LiNiPO_4$, a silicon-containing active material, such as $Li_2FeSiO_4$ or $Li_2MnSiO_4$, a rock salt layer-type active material in which a part of a transition metal is substituted with a different kind of metal, such as $LiNi_{0.8}Co_{(0.2-x)}Al_xO_2$ ($0<x<0.2$), a spinel-type active material in which a part of a transition metal is substituted with a different kind of metal, such as $Li_{1+x}Mn_{2-x-y}M_yO_4$ (M being at least one of Al, Mg, Co, Fe, Ni or Zn, and $0<x+y<2$), or lithium titanate, such as $Li_4Ti_5O_{12}$.

The sulfide active material may include copper Chevrel, iron sulfide, cobalt sulfide, nickel sulfide or the like.

The anode active material may include, for example, a carbon active material or a metal active material, without being limited to a specific material.

The carbon active material may include mesocarbon microbeads (MCMB), graphite, such as highly oriented pyrolytic graphite (HOPG), or amorphous carbon, such as hard carbon or soft carbon.

The metal active material may include In, Al, Si, Sn, or an alloy including at least one of these elements.

The solid electrolyte may include an oxide-based solid electrolyte or a sulfide-based solid electrolyte. However, a sulfide-based solid electrolyte having high lithium ion conductivity may be used as the solid electrolyte.

The sulfide-based solid electrolyte may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, and Z being one of Ge, Zn and Ga), $Li_2S$—$GeS_2$, $Li_2S$—$SiS_2$—$Li_3PO_4$, $Li_2S$—$SiS_2$—$Li_xMO_y$, (x and y being positive numbers, and M being one of P, Si, Ge, B, Al, Ga and In), or $Li_{10}GeP_2S_{12}$.

The electrode material may further include a conductive material. The conductive material may forms electron conduction paths in the electrode. The conductive material may include carbon black, conductive graphite, ethylene black, an $sp^2$ carbon material, such as carbon nanotubes, or graphene.

The electrode material may further include a dispersant. The dispersant may increase dispersibility of the respective components of the electrode material so as to manufacture a uniform electrode.

The first slurry may be manufactured by mixing the prepared binder solution and the prepared electrode material (S3). This operation is a kind of pre-mixing operation, and is executed so as to uniformly disperse the respective components.

The binder solution and the electrode material are mixed so that the contents thereof are adjusted to fit the intended composition of a final electrode, and particularly, may be mixed so that the solid content in the first slurry is greater than about 90% by weight and 95% by weight or less. Here, the solid content indicates the total content of solid components in the slurry except for the solvent.

Mixing of the binder solution and the electrode material is not limited to a specific method, and may be performed using a device, such as a planetary disperser (PD) mixer, a roller mixer or the like. Further, mixing of the binder solution and the electrode material is not limited to specific mixing conditions, and may be performed, for example, at 10 rpm to 50 rpm for 10 minutes to 1 hour.

The second slurry having a specific solid content may be manufactured by additionally adding the binder solution to the first slurry (S4).

The solid content in the second slurry may range from about 60% by weight to 90% by weight. When the solid content in the second slurry is less than 60% by weight, viscosity is excessively low, shear stress is not applied to the second binder, which will be described later, and thus, it may be difficult to fiberize the second binder and to change the second slurry into the clay state. On the other hand, when the solid content in the second slurry exceeds 90% by weight, it is easy to change the second slurry into the clay state, but the second slurry is changed into the clay state before the second binder is completely dispersed and thus the electrode, which is final product, may be nonuniform.

Mixing of the additionally binder solution with the first slurry is not limited to a specific method, and may be performed using a device, such as the planetary disperser (PD) mixer, the roller mixer or the like. Further, mixing of the additionally input binder solution with the first slurry is not limited to specific mixing conditions, and may be performed, for example, at 10 rpm to 50 rpm for 10 minutes to 1 hour.

The resultant material in the clay state may be prepared by adding the second binder in the powder state to the second slurry and then kneading the acquired mixture (S5).

The second binder may provide mechanical properties to the electrode, and the present disclosure is characterized in that the second binder is fiberized by applying shear stress thereto. For this purpose, the present disclosure proposes a solid content in the second slurry, kneading conditions, etc., which allow the second binder to be uniformly disposed and to be effectively fiberized.

The second binder may include at least one selected from the group consisting of polytetrafluoroethylene (PTFE), polyvinylidene difluoride (PVDF), poly(ethylene oxide) (PEO), polyethylene (PE), and combinations thereof.

The resultant material in the clay state may be prepared by adding the second binder to the second slurry and then kneading the acquired mixture using the device, such as the planetary disperser (PD) mixer, the roller mixer or the like. Concretely, kneading of the acquired mixture may be performed at a speed of 10 rpm to 50 rpm for 10 minutes to 1 hour.

The electrode may be manufactured by rolling the resultant material in the clay state (S6).

Rolling of the resultant material in the clay state is not limited to a specific method, and the electrode may be manufactured by pressing the result material in the clay state using a pair of rollers or a press machine.

The method for manufacturing the electrode may further include drying the electrode acquired by the above-described process. The electrode is dried so as to completely remove the solvent remaining in the electrode. Therefore, the electrode may be dried until the solvent is completely removed at a temperature close to or higher than the evaporation point of the solvent included in the electrode.

The electrode may include an amount of about 70% by weight to 90% by weight of the electrode active material, an amount of about 5% by weight to 25% by weight of the solid electrolyte, an amount of about 0.5% by weight to 5% by weight of the conductive material, an amount of about 0.05% by weight to 0.5% by weight of the dispersant, an amount of about 0.5% by weight to 5% by weight of the first binder, and an amount of about 0.1% by weight to 10% by weight of the second binder.

When the content of the electrode active material is less than 70% by weight, the loading amount thereof is small, and thus, the capacity and the energy density of the electrode may be reduced. On the other hand, when the content of the electrode active material exceeds 90% by weight, the content of other components including the solid electrolyte, the first binder and the second binder is relatively reduced, and thus, it may be difficult to manufacture the electrode.

When the content of the solid electrolyte is less than 5% by weight, lithium ion conductivity of the electrode is reduced, and thus, the efficiency thereof may be reduced, and, when the content of the solid electrolyte exceeds 25% by weight, the content of the electrode active material is reduced, and thus, the capacity and the energy density of the electrode may be reduced.

When the content of the second binder is less than 0.1% by weight, the mechanical properties of the electrode are reduced, and thus, it may be difficult to form an electrode in the form of a thick film. On the other hand, when the content of the second binder exceeds 10% by weight, the resultant material in the clay state is excessively hard, and thus, dispersibility of the respective components may be reduced and it may be difficult to fiberize the second binder.

Hereinafter, the present disclosure will be described in more detail through the following examples. The following examples serve merely to exemplarily describe the present disclosure, and are not intended to limit the scope of the disclosure.

COMPARATIVE EXAMPLE 1

An electrode was manufactured by a dry process without using the binder solution according to the present disclosure. Specifically, polytetrafluoroethylene (PTFE) in a powder state as a binder was input to an electrode material including an NCM-based cathode active material, a sulfide-based solid electrolyte and a conductive material, and an acquired mixture was kneaded. The amounts of the respective components and kneading conditions are set forth in Table 1 below.

TABLE 1

| Component | Amount | RPM | Time | Solid content |
|---|---|---|---|---|
| Cathode active material | 376 g | 25 | 30 min | 100% |
| Solid electrolyte | 111.5 g | | | |
| Conductive material | 7.5 g | | | |
| Dry binder (PTFE) | 5 g | | | |

FIG. 2A shows an image of a resultant material manufactured according to Comparative Example 1. FIG. 2B shows an analysis result of the resultant material of FIG. 2A using a scanning electron microscope (SEM).

Referring to FIG. 2A, it may be confirmed that, when the solid content is 100% by weight as in Comparative Example 1, the resultant material was not changed into the clay state. Further, it may be confirmed through FIG. 2B that PTFE serving as the binder was not fiberized, and was mixed as it is in the powder state.

COMPARATIVE EXAMPLE 2

A binder solution having a first binder content of about 6.3% by weight was prepared by adding a first binder to a solvent. A slurry having a solid content of about 93% by weight was manufactured by mixing the binder solution with an electrode material including an NCM-based cathode active material, a sulfide-based solid electrolyte, a conductive material and a dispersant.

Polytetrafluoroethylene (PTFE) in a powder state as a second binder was add to the slurry, and an acquired mixture was kneaded. The amounts of the respective components and kneading conditions are set forth in Table 2 below.

TABLE 2

| Component | Amount | RPM | Time | Solid content |
|---|---|---|---|---|
| Cathode active material | 400 g | 25 | 30 min | 92.8% |
| Solid electrolyte | 100 g | | | |
| Conductive material | 7.74 g | | | |
| Dispersant* | 5.16 g | | | |
| Binder solution** | 37.5 g | | | |
| Dry binder (PTFE) | 2.58 g | 25 | 30 min | |

*The dispersant was in the state of being dispersed in a solvent (4.64 g of the solvent + 0.52 g of the dispersant).
**The binder solution included 2.36 g of the first binder and 35.14 g of the solvent.

Figure 3A:
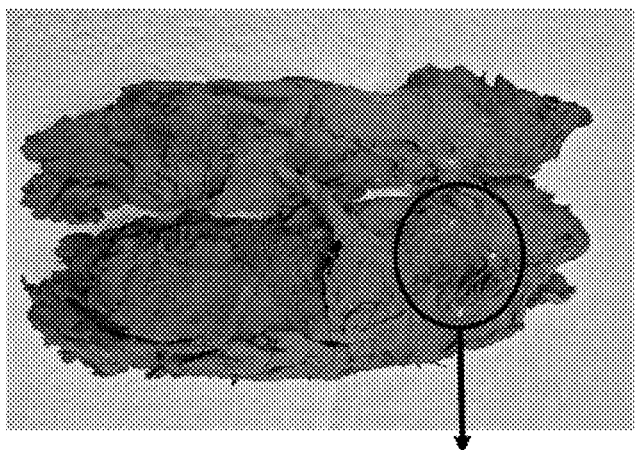
FIG. 3A shows an image of a resultant material manufactured according to Comparative Example 2.
Figure 3B:
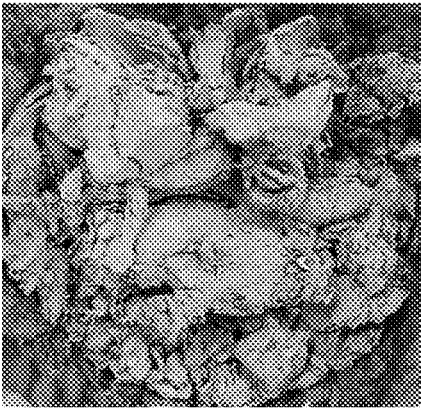
FIG. 3B shows an analysis result of the resultant material of FIG. 3A using the SEM.

FIG. 3A shows an image of a resultant material manufactured according to Comparative Example 2. FIG. 3B shows an analysis result of the resultant material of FIG. 3A using the SEM.

Referring to FIG. 3A, it may be confirmed that, when PTFE was added to the slurry having the solid content exceeding 90% by weight and then the acquired mixture was kneaded, the resultant material was changed into the clay state but a large amount of PTFE was not dispersed. Referring to FIG. 3A, it may be confirmed that, because PTFE was added to the slurry in the state in which the solid content in the slurry is excessively high, the resultant material was changed into the clay state before PTFE was completely dispersed, and thus, PTFE was not properly fiberized.

EXAMPLE

A binder solution having a first binder content of about 6.3% by weight was prepared by inputting a first binder to a solvent. A first slurry having a solid content of about 93% by weight was manufactured by mixing the binder solution with an electrode material including an NCM-based cathode active material, a sulfide-based solid electrolyte, a conductive material and a dispersant.

A second slurry having a solid content of about 86% by weight was manufactured by additionally adding the binder solution to the first slurry.

Polytetrafluoroethylene (PTFE) in a powder state as a second binder was input to the second slurry, and an acquired mixture was kneaded. The amounts of the respective components and kneading conditions are set forth in Table 3 below.

TABLE 3

| Category | Component | Amount | RPM | Time | Solid content |
|---|---|---|---|---|---|
| 1 | Cathode active material | 400 g | 25 | 30 min | 92.8% |
| | Solid electrolyte | 100 g | | | |

TABLE 3-continued

| Category | Component | Amount | RPM | Time | Solid content |
|---|---|---|---|---|---|
| | Conductive material | 7.8 g | | | |
| | Dispersant* | 5.2 g | | | |
| | Binder solution** (first input) | 37.5 g | | | |
| 2 | Binder solution*** (additional input) | 45 g | 25 | 15 min | 86% |
| 3 | Dry binder (PTFE) | 6.5 g | 25 | 30 min | |

*The dispersant was in the state of being dispersed in a solvent (4.68 g of the solvent + 0.52 g of the dispersant).
**The binder solution included 2.36 g of the first binder and 35.14 g of the solvent.
***The binder solution included 42.16 g of the first binder and 2.86 g of the solvent.

Figure 4A:
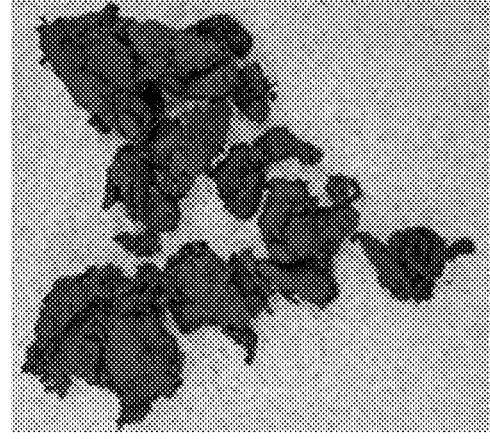
FIG. 4A shows an image of a resultant material manufactured according to Example.
Figure 4B:
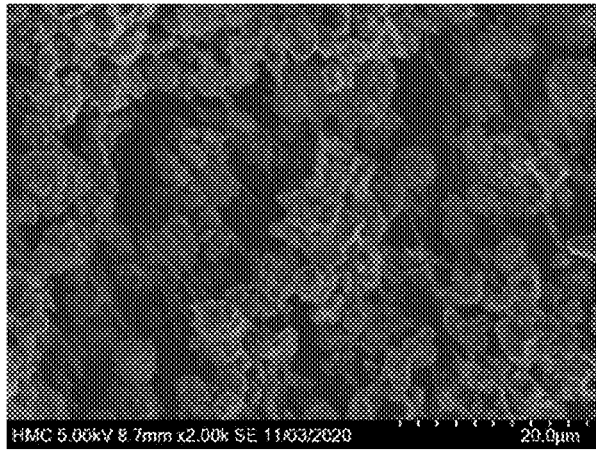
FIG. 4B shows an analysis result of the resultant material of FIG. 4A using the SEM.

FIG. 4A shows an image of a resultant material manufactured according to Example. FIG. 4B shows an analysis result of the resultant material of FIG. 4A using the SEM.

Referring to FIGS. 4A and 4B, it may be confirmed that, when PTFE was input to the second slurry prepared through the method according to Example and the acquired mixture was kneaded, the result material in the clay state was acquired, and PTFE was sufficiently fiberized by shear stress.

An electrode was manufactured by rolling the result material in the clay state using a roll mill. The composition of the electrode is set forth in Table 4 below.

TABLE 4

| Category | Content [wt %] |
|---|---|
| Cathode active material | 76.92 |
| Solid electrolyte | 19.23 |
| Conductive material | 1.5 |
| Dispersant | 0.1 |
| First binder | 1 |
| Second binder | 1.25 |

Figure 5A:
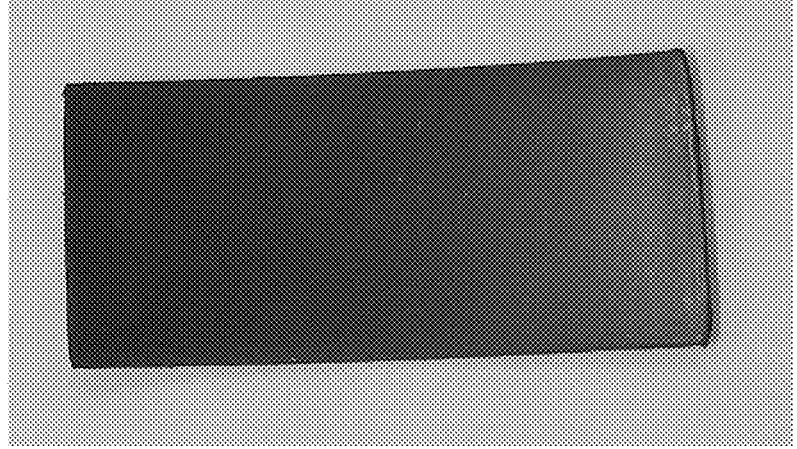
FIG. 5A shows an image of an electrode according to Example.
Figure 5B:
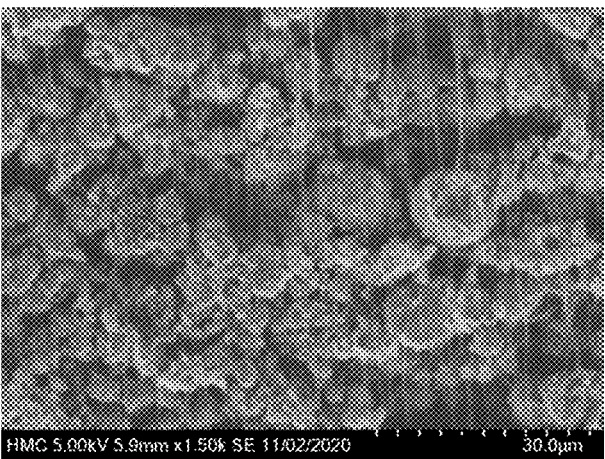
FIG. 5B shows an analysis result to the cross-section of the electrode of FIG. 5A using the SEM.

FIG. 5A shows an image of the electrode according to Example. FIG. 5B shows an analysis result to the cross-section of the electrode of FIG. 5A using the SEM.

Referring to FIGS. 5A and 5B, it may be confirmed that an electrode in the form of a thin film configured such that respective components are uniformly dispersed therein and PTFE is sufficiently fiberized may be manufactured by the method according to the present disclosure.

As is apparent from the above description, the present disclosure may provide a method for uniformly manufacturing an electrode in the form of a thin film having a large loading amount of an electrode active material.

Further, through the method according to the present disclosure, the electrode in the form of the thin film having the large loading amount of the electrode active material may be easily and rapidly manufactured.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for manufacturing an electrode for all-solid-state batteries, the method comprising:
    preparing a binder solution by dispersing a first binder in a solvent;
    preparing an electrode material comprising an electrode active material and a solid electrolyte;
    producing a first slurry by mixing the binder solution and the electrode material;
    producing a second slurry by additionally adding the binder solution to the first slurry;
    adding a second binder in a powder state to the second slurry and kneading it to obtain a resultant material in a clay state; and
    producing the electrode by rolling the resultant material in the clay state,
    wherein the first binder comprises at least one of butadiene rubber (BR), nitrile butadiene rubber (NBR), hydrogenated nitrile butadiene rubber (HNBR), polyvinylidene difluoride (PVDF), carboxymethyl cellulose (CMC), or any combination thereof, and
    wherein the second binder comprises at least one of polytetrafluoroethylene (PTFE), polyvinylidene difluoride (PVDF), poly(ethylene oxide) (PEO), polyethylene (PE), or any combination thereof,
    wherein a solid content in the second slurry ranges from about 60% by weight to about 90% by weight,
    wherein a solid content in the first slurry is greater than about 90% by weight and about 95% by weight or less, and
    wherein the second binder is fiberized during kneading the second binder.

2. The method of claim 1, wherein the solvent comprises at least one of hexyl butyrate, xylene, toluene, butyl butyrate, benzyl acetate, or any combination thereof.

3. The method of claim 1, wherein the binder solution comprises an amount of about 5% by weight to 10% by weight of the first binder and an amount of about 90% by weight to 95% by weight of the solvent.

4. The method of claim 1, wherein the electrode material further comprises a conductive material.

5. The method of claim 1, wherein the resultant material is prepared by adding the second binder to the second slurry and kneading the second slurry at about 10 rpm to 50 rpm for about 10 minutes to 1 hour.

6. The method of claim 1, further comprising drying the electrode.

7. The method of claim 1, wherein the electrode comprises:
    an amount of about 70% by weight to 90% by weight of the electrode active material;
    an amount of about 5% by weight to 25% by weight of the solid electrolyte;
    an amount of about 0.5% by weight to 5% by weight of the first binder; and
    an amount of about 0.1% by weight to 10% by weight of the second binder.

* * * * *